US00RE37219E

(19) United States
(12) Reissued Patent
Takahara et al.

(10) Patent Number: US RE37,219 E
(45) Date of Reissued Patent: Jun. 12, 2001

(54) METHOD OF FABRICATING A POLYMER DISPERSED LIQUID CRYSTAL PANEL WITH MEASURING THICKNESS, ADJUSTING THEN HARDENING

(75) Inventors: Hiroshi Takahara, Neyagawa; Masao Yamamoto, Kishiwada, both of (JP)

(73) Assignee: Matsushita Electric Industrial Co., Ltd., Osaka (JP)

(21) Appl. No.: 08/620,156

(22) Filed: Mar. 22, 1996

Related U.S. Patent Documents

Reissue of:
(64) Patent No.: 5,426,522
Issued: Jun. 20, 1995
Appl. No.: 08/101,769
Filed: Aug. 4, 1993

(30) Foreign Application Priority Data

Aug. 4, 1992 (JP) ..... 4-207759
Jul. 23, 1993 (JP) ..... 5-182571

(51) Int. Cl.[7] ..... G02F 1/13; G02F 1/1335
(52) U.S. Cl. ..... 349/92; 349/94; 445/24
(58) Field of Search ..... 349/92, 93, 94, 349/86, 88; 445/24

(56) References Cited

U.S. PATENT DOCUMENTS 4,435,047 * 3/1984 Fergason ..... 359/52
4,944,576 * 7/1990 Lacker et al. ..... 359/51
5,150,232 * 9/1992 Gunkima et al. ..... 359/94
5,278,686 * 1/1994 Iwamoto et al. ..... 359/62
5,305,126 * 4/1994 Kobayashi et al. ..... 359/52

FOREIGN PATENT DOCUMENTS 3-58021 * 3/1991 (JP) .
4-84121 * 3/1992 (JP) .

* cited by examiner

*Primary Examiner*—James A. Dudek
(74) *Attorney, Agent, or Firm*—Wenderoth, Lind & Ponack, L.L.P.

(57) ABSTRACT

An empty cell is produced by adhering an array substrate and a counterelectrode substrate with a sealant resin of a predetermined height. A mixture liquid comprising liquid crystal and a polymerizable photosetting resin is injected into the empty cell. Then, the cell is interposed between a flat rigid bench and a flat rigid plate, and the mixture liquid is heated to make it transparent. Then, the thickness of the mixture liquid is measured with an interferometer. If the measured thickness deviates from a predetermined range, the flat rigid plate is pressed until the measured thickness changes into the predetermined range. Then, the mixture liquid is irradiated to form a liquid crystal/resin composite layer. Then, the pressure is removed. Thus, a liquid crystal/resin composite layer of uniform thickness can be obtained.

16 Claims, 5 Drawing Sheets

METHOD OF FABRICATING A POLYMER DISPERSED LIQUID CRYSTAL PANEL WITH MEASURING THICKNESS, ADJUSTING THEN HARDENING

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a method of fabricating a liquid crystal panel including a liquid crystal/resin composite layer as a light modulation layer.

2. Description of the Prior Art

A display device employing a liquid crystal display panel has been studied and developed widely because of its compact size and its light weight. Recently, pocket television sets employing a twisted nematic (TN) mode liquid crystal display panel have been used practically. Furthermore, image projection type television systems, view finders, and the like using the liquid crystal display panel as a light bulb have also been used practically.

However, a TN mode liquid crystal display panel has disadvantages such as low brightness of display due to the two polarization plates needed for light modulation. Further, fabrication steps are complex. For example, rubbing is needed in order to align liquid crystal molecules.

Recently, liquid crystal panels with use of liquid crystal/resin composite have attracted attention because it need no polarizing plates and no rubbing step on fabrication. A liquid crystal/resin composite is a composite of a liquid crystal component and a resin component, and the liquid crystal component extends in the matrix made of the resin (polymer) component. The structure of the liquid crystal/resin composite changes according to the ratio of the liquid crystal component to the resin component, and it is classified typically into two types according to the ratio of the liquid crystal component to the polymer (resin) component. In one type of the composite having a small ratio of the liquid crystal component, droplets of liquid crystal are dispersed in the voids of the resin layer, and the liquid crystal exists discontinuously, as shown schematically in FIGS. 1(a) and 1(b). This type is called as polymer dispersed liquid crystal. If the amount of the liquid crystal component is increased, droplets contact with each other to form a continuous phase. In the other type having a large ratio of the liquid crystal component, a network of the resin component is formed and the liquid crystal exists not as droplets, but extends in the network continuously. This structure is analogous to a sponge impregnated with liquid crystal. This type is called as polymer network liquid crystal.

The above-mentioned two types of liquid crystal/polymer composite can be used to display an image by controlling the scattering and transmission of light. A display panel with use of the polymer dispersed liquid crystal uses a property that the refractive index of the liquid crystal varies with the orientation direction of the liquid crystal molecules. FIG. 1(a) shows schematically a polymer dispersion liquid crystal layer 136 interposed between two substrates 131 and 132 each having thin film transistors 134 and pixel electrodes 135 and a counterelectrode 133. The polymer dispersion liquid crystal 136 comprises liquid crystal droplets 141 in the resin matrix 142. Without applying a voltage to the liquid crystal 136, the liquid crystal molecules in the droplets 141 align in irregular directions, as shown in FIG. 1(a). In this state, a difference in refractive index exists between the liquid crystal droplets 141 and the resin 142 to scatter the incident light. By applying a voltage to the liquid crystal 136, the liquid crystal molecules are aligned in a direction, as shown in FIG. 1(b). If the refractive index of the liquid crystal component oriented in the direction is controlled preliminarily to coincide with that of the resin component, the incident light is not scattered in the liquid crystal, but transmits through it. On the other hand, the polymer network liquid crystal uses the irregularity itself of the orientation of the liquid crystal molecules for scattering the light. In the irregular orientation state, or without applying a voltage to the liquid crystal, the incident light is scattered through the liquid crystal, while when the molecules align in a direction by applying a voltage to the liquid crystal, the light transmits through the liquid crystal. The above-mentioned liquid crystal/resin composite does not need a polarizer and an analyzer for modulating the light. Therefore, it can display an image at a high luminance by twice or more when compared with a display panel with use of a twisted nematic liquid crystal.

U.S. Pat. No. 4,435,047 disclosed a prior art fabrication method of a liquid crystal panel including a liquid crystal/resin composite. A mixture liquid comprising a nematic liquid crystal and a polyvinyl alcohol (PVA) as a polymer is applied to an electrode substrate with a print technique, and it is interposed between the substrate and a counterelectrode substrate. However, it is difficult to realize a uniform thickness of liquid crystal by using the print technique, so that the scattering of brightness arises in the display image of the liquid crystal panel. Further, because the polyvinyl alcohol is a water-soluble polymer, the water resistance is bad and the liquid crystal panel becomes white and swells. Further, it need a long time to set the resin.

Japanese Patent laid open Publication 3-58021/1991 discloses a liquid crystal panel with a liquid crystal/resin composite. Two electrode substrates are arranged so as to oppose the electrodes each other, and spacers such as beads are scattered between the two substrates. The periphery of the two substrates are sealed with an epoxy sealant except an injection hole to complete an empty cell. Then, a mixture liquid comprising a liquid crystal and uncured resin is injected through the injection hole and the injection hole is sealed. Then, ultraviolet rays irradiate the mixture liquid to set the resin so as to separate the resin from the liquid crystal.

In the above-mentioned liquid crystal panel, and uniform thickness of the liquid crystal/resin composite is realized because spacers such as beads are used, and the brightness is also uniform in the display area due to the spacers. However, the beads 137 also exist in the display area as shown in FIG. 2, and this causes a problem. A liquid crystal/resin composite 136 has a thickness enough to scatter light sufficiently, while if the thickness becomes high, a higher electric voltage is needed to make the composite layer transparent. Usually, the thickness of the composite layer 136 is selected to be about 15 $\mu$m. On the other hand, the size of a pixel in the display area in a liquid crystal panel has a tendency to become smaller. For example, if the display area is three inches square and includes about 300,000 or 1,000,000 pixels, a pixel occupies an area of about 100 or 50 $\mu$m square. Even if the area of a pixel is small, the thickness of the liquid crystal/resin composite layer has to be as high as about 15 $\mu$m. If beads 137 of about 15 $\mu$m of diameter are used, the light transmits beads 137 which occupy spaces in the display area. Because the size of the beads 137 is not so small as compared with the size of a pixel such as 50 μm, the light transmitting the beads 137 in the display area or the beads 137 do not modulate the light and remains as white points which are remarkable in the display area. This deteriorates the display quality especially pixels of small area.

There is another fabrication technique to form bank-like supporters on the source lines for applying an electric voltage to the pixels (Japanese Patent laid open Publication 4-84121/1992). If this technique is applied to a liquid crystal/resin composite panel, the height of the bank-like supporters have to be as high as about 15 μm. However, it is difficult to form such supporters of 15 μm height by using the patterning technique. Further, even if such supporters can be formed, it is difficult to inject a mixture liquid inside the supporters.

SUMMARY OF THE INVENTION

An object of the present invention is to provide a method of fabricating a liquid crystal panel of a uniform thickness of liquid crystal layer without using beads.

In one aspect of the present invention of a method for to manufacturing a liquid crystal panel, a first electrode substrate and a second electrode substrate are provided, and a mixture liquid comprising a liquid crystal and monomers of a resin is filled between the first and second electrode substrates. Then, the thickness of the mixture liquid interposed between the first and second electrode is measured. Then, the mixture resin is hardened to separate into a liquid crystal portion and a resin portion. Thus, a liquid crystal/resin composite layer of a known thickness can be prepared.

In another aspect of the present invention of a method for manufacturing a liquid crystal panel, a first electrode substrate and a second electrode substrate are provided. A support member of a predetermined height, say 15 μm, is arranged at the periphery of the first and second electrode substrates, and the first and second electrode substrate are fixed via the support member. Next, a mixture liquid comprising a liquid crystal and monomers of a photosetting or thermosetting resin is filled in a space enclosed by the support member between the first and second electrode substrates, and the thickness of the mixture liquid interposed between the first and second electrode substrates is measured. Preferably, the photosetting resin comprises an ultraviolet-rays-resin. For a large liquid crystal panel, the thickness of the mixture may be different at the center from the predetermined thickness determined by the support member. Next, the thickness of the mixture liquid is measured and adjusted. The mixture liquid is opaque at room temperature. Then, the mixture liquid is heated to become isotropic or transparent and the thickness is measured in the transparent state with a interferometer or the like. Then, if the measured thickness is outside the predetermined range, the thickness of the mixture liquid is changed within a predetermined range by changing the pressure applied to the substrates. The mixture resin is set with optical radiations or thermally to separate the mixture liquid into a liquid crystal portion and a resin portion while keeping the thickness within the predetermined range. Then, the pressure is removed. Because the resin becomes a solid polymer, the thickness of the resultant liquid crystal/resin composite layer can be kept uniform even for a wide liquid crystal panel.

An advantage of the present invention is that a liquid crystal panel with a known thickness of a liquid crystal layer can be fabricated.

Another advantage of the present invention is that a liquid crystal panel with a liquid crystal layer of a uniform thickness can be fabricated even for a large display area.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1A:
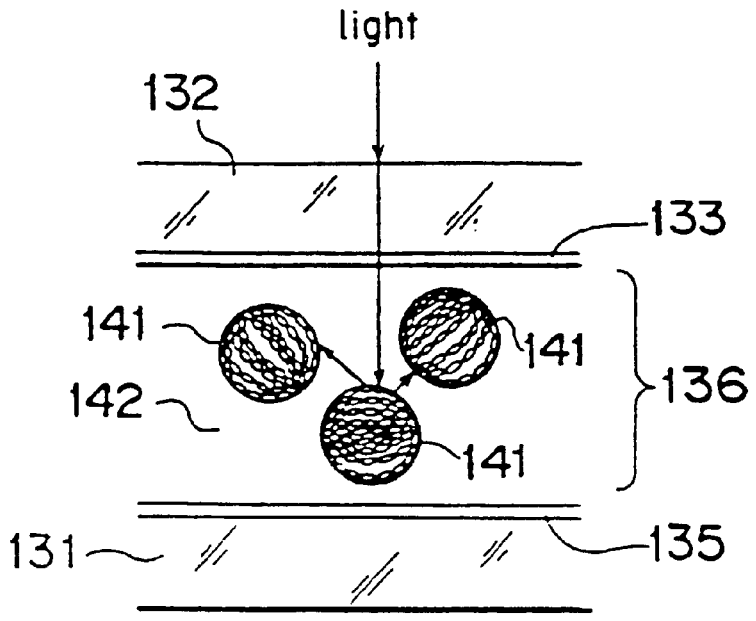
FIGS. 1(a) and 1(b) are schematic partial sectional views of a polymer dispersion liquid crystal under no applied electric field and under an applied electric field, respectively.
Figure 1B:
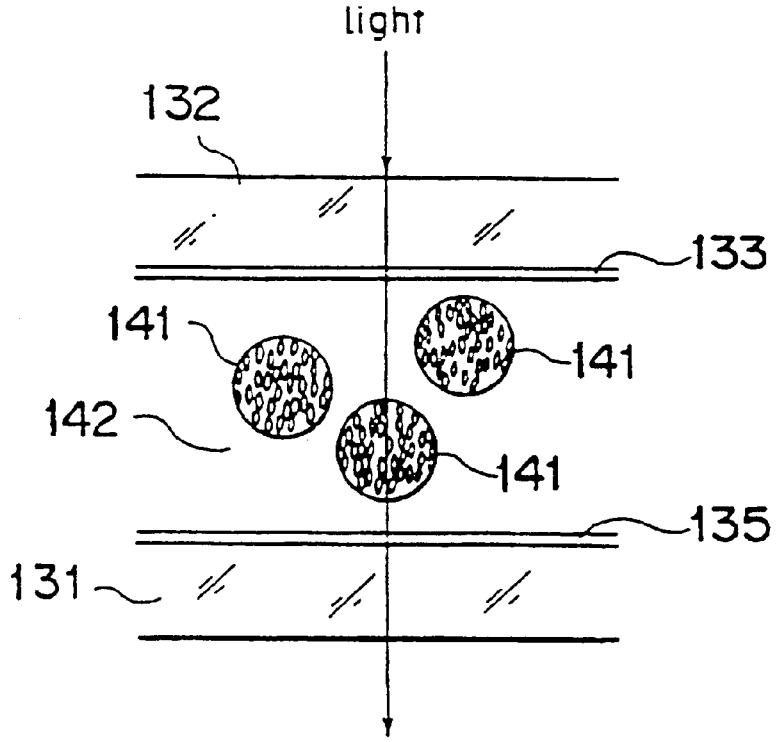
Figure 2:
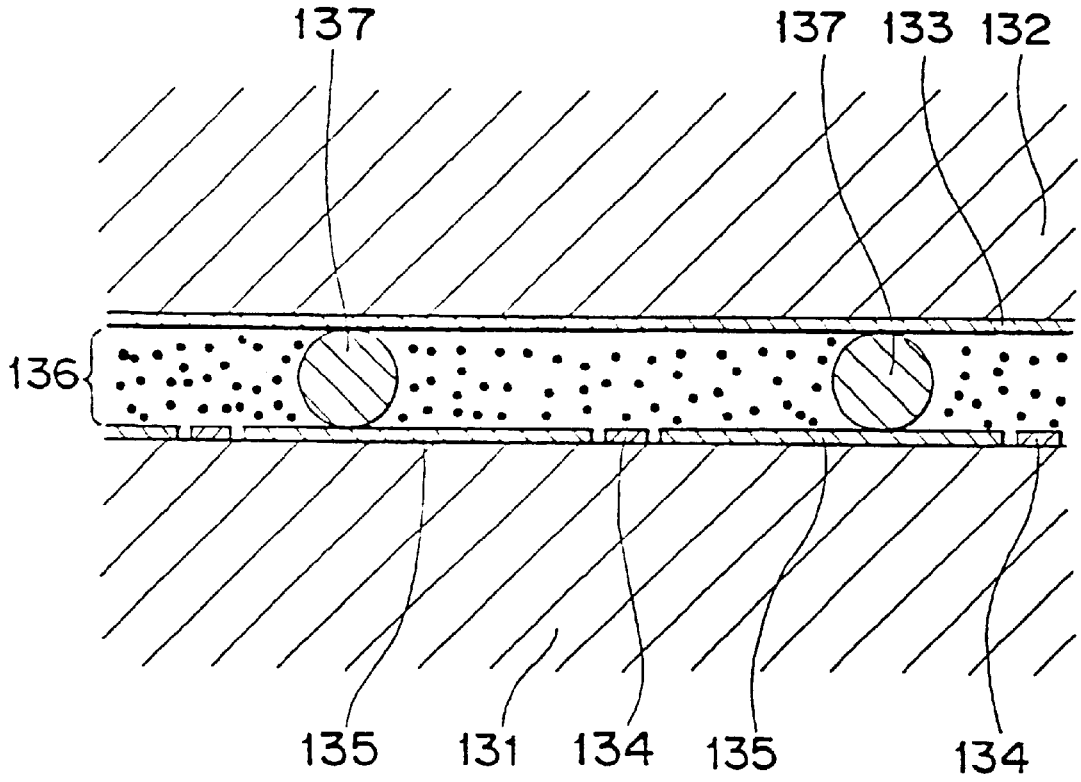
FIG. 2 is a partial sectional view of a prior art liquid crystal panel including beads in display area.

Referring now to the drawings, wherein like reference characters designate like or corresponding parts throughout the several views, an embodiment of a fabricating method of a liquid crystal panel according to the present invention will be explained. Although the polymer dispersed liquid crystal panel is taken as examples in the following embodiments for simplicity, either of the display panels using a polymer dispersed liquid crystal or a polymer network liquid crystal can be used in the present invention.

Figure 3A:
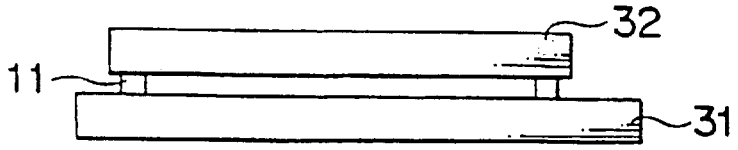
FIG. 3(a), 3(b), 3(c), 3(d) and 3(e) are schematic sectional views of steps of fabricating a liquid crystal panel.

FIGS. 3(a)–3(e) illustrate steps of fabrication a liquid crystal panel. First, an array substrate 31 and a counterelectrode substrate 32 are provided. Pixel electrodes and thin film transistors (not shown for simplicity) have been formed on the array substrate 31, while a counterelectrode (not shown) have been formed on the counterelectrode substrate 32. Then, a sealant resin 11 is applied to the periphery of a display area of the array substrate 31 or the counterelectrode substrate 32. The sealant resin 11 includes fibers, beads or the like in order to attain a desired height. The height of the sealant resin 11 will agree with that of liquid crystal in the liquid crystal panel eventually. For example, if the desired thickness of liquid crystal is 15 μm, beads of 15 μm of diameter of the like are added. The beads or the like are not distributed in the display area in contrast to prior arts. It is preferable that the sealant resin 11 is an ultraviolet-rays-setting resin. After applying the sealant resin 11, the substrates 31 and 32 are adhered to each other, as shown in FIG. 3(a), and the sealant resin 11 is hardened by irradiated with ultraviolet rays. The obtained liquid crystal cell without liquid crystal is called as an empty cell.

Figure 3B:
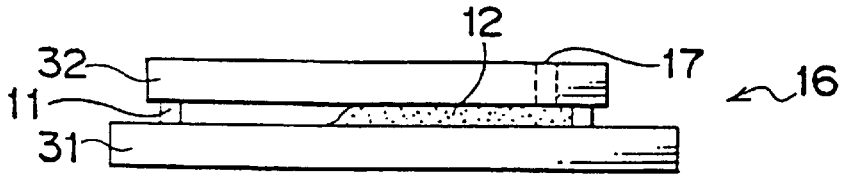

Next, a mixture liquid 12 comprising a liquid crystal and a polymerizable resin before polymerization (an uncured resin) is prepared, and the mixture liquid 12 is injected into the empty cell with use of a pressure injection technique. That is, the mixture liquid 12 is injected under pressure into the empty cell through an injection hole 17 of 1–2 mm of diameter provided at the periphery of the counterelectrode substrate 32, as shown in FIG. 3(b). On the other hand, if a vacuum injection technique, after the space between the two substrates 31, 32 is evacuated, the injection hole 17 is immersed in a mixture liquid 12 to attract it into the empty space between the two substrates 31, 32. However, the vacuum injection technique is not appropriate for light modulation of good scattering characteristic because components such as monomers splashes from the mixture liquid 12 when a vacuum state is realized. In a modified example, the injection hole is not formed in the counterelectrode substrate 32, and a part of the sealant resin 11 is removed to use the remained section as an injection hole. The mixture liquid 12 may have components for either of a polymer dispersed liquid crystal or a polymer network liquid crystal of the liquid crystal/resin composite.

Preferably, the liquid crystal component in the mixture liquid 12 is a nematic liquid crystal, a smectic liquid crystal, or a cholesteric liquid crystal. The liquid crystal may consist of a single compound or a mixture of two or more liquid crystals, or a mixture further including a substance other than liquid crystal compounds. Among the above-mentioned liquid crystal materials, cyanobiphenyl group nematic liquid crystals are preferable because they have a large difference $\Delta n$ of the anomalous refractive index $n_e$ from the normal refractive index $n_o$. Preferably, the resin material is a transparent resin, and any of thermoplastic resin, thermosetting resin, and photosetting resin may be selected. A photosetting resin such as an ultraviolet-rays-setting acrylic resin is preferable because it can be easily produced and well separated from the liquid crystal. Particularly, a resin is preferable which contains acrylic monomers or acrylic oligomers which can be polymerized and set by ultraviolet ray irradiation. When a mixture of such monomers with a liquid crystal material is irradiated with ultraviolet rays, only the resin material reacts to form a polymer (resin), and the liquid crystal phase is separated from the resin phase.

A monomer used to prepare the polymer phase may be 2-ethylhexyl acrylate, 2-hydroxyethyl acrylate, neopentyl glycol diacrylate, hexanediol diacrylate, diethylene glycol diacrylate, tripropylene glycol diacrylate, polyethylene glycol diacrylate, trimethylol propane triacrylate, pentaerythritol acrylate or the like. An oligomer or prepolymer for the polymer phase may be polyester acrylate, epoxy acrylate, polyurethane acrylate or the like.

In order to enhance the polymerization rate, a polymerization initiator may be used such as a 2-hydroxy-2-methyl-1-phenylpropane-1-on ("Darocure 1173" available from Ciba-Geigy Ltd.), 1-(4-isopropylphenyl)-2-hydroxy-2-methylpropane-1-on ("Darocure 1116" available from Ciba-Geigy Ltd.), 1-hydroxy cyclohexyl phenylketone ("Irgacure 651" available from Merck) or the like. Furthermore, a chain transfer agent, a photosensitizer, a dye, a crosslinking agent or the like may be appropriately incorporated as an additional ingredient.

Further, the refractive index $n_p$ in a state where the resin material is set is made to agree roughly with the normal refractive index $n_o$ of the liquid crystal. When an electric field is applied to the liquid crystal layer, liquid crystal molecules are aligned in one direction to make the refractive index of the liquid crystal to be $n_o$ so as to make the liquid crystal layer transparent. If the refractive index $n_p$ is different largely from the normal refractive index $n_o$, the liquid crystal layer does not become transparent completely when an electric field is applied to the liquid crystal layer, and the illuminance of display decreases.

The ratio of the liquid crystal component to the resin component in the liquid crystal/resin composite is generally 20 to 90 wt %, preferably 50–80 wt %. If the ratio is less than 20 wt %, the amount of liquid crystal droplets is small so that the effect of a change of the refractive index is small. On the other hand, if the ratio is more than 90 wt %, there is a tendency that the resin component and the liquid crystal component are separated from each other into top and bottom layers, so that the ratio of the interface decreases to lower the scattering property of the liquid crystal layer. The structure of the liquid crystal/resin composite depends on the ratio. If the ratio is less than 50 wt %, the liquid crystal component exists as droplets, while it is 50 wt % or more, a continuous phase appears wherein the resin and liquid crystal components are tangled with each other.

The thickness of the liquid crystal layer is selected between 5 to 25 $\mu$m, preferably 8 to 15 $\mu$m. If the thickness is too small, the scattering characteristics is bad or the contrast is bad, while if the thickness is too large, a high voltage drive is needed and the design of a drive circuit for applying signals to pixel electrodes becomes difficult.

Preferably, the weight ratio of the liquid crystal is between 55 and 65 weight percent or between 75 and 85 weight percent. Further, a ratio of monomers to oligomers is preferably between 5:5 and 6:4 if the weight ratio of the liquid crystal is between 55 and 65 weight percent, or preferably 9:1 and 8:2 if the weight ratio is between 75 and 85 weight percent, in order to produce a liquid crystal layer of good scattering properties at a low voltage. More preferably, the weight ratio of the liquid crystal is about 60 weight percent and the ratio of monomers to oligomers is about 4:6.

Figure 3C:
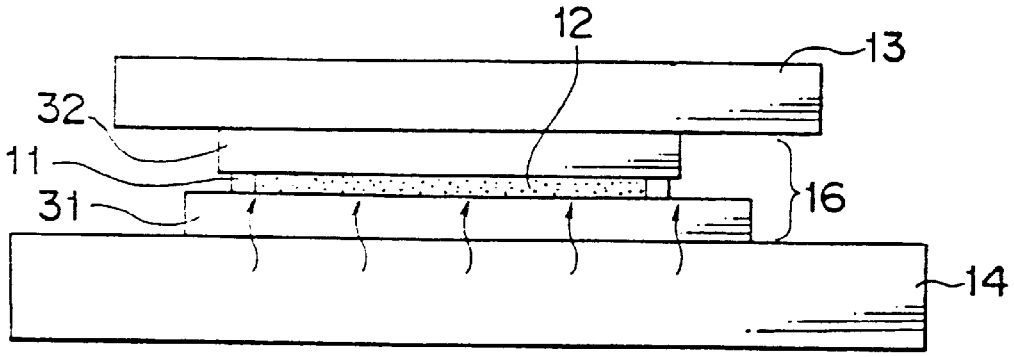

After the above-mentioned injection of the mixture liquid shown in FIG. 3(b), the array substrate 31 of the liquid crystal panel 16 fabricated above is put on a flat rigid bench 14, as shown in FIG. 3(c). The flat rigid bench means a bench which does not bend under pressure. As explained later, the flat rigid bench 14 is heated to a predetermined temperature to make the liquid crystal 11 transparent. The flat rigid bench 14 is for example a heater plate. Next, a flat rigid plate 13 which can transmit ultraviolet rays covers the counterelectrode substrate 32. The flat rigid plate means a plate which does not bend under pressure. The flat rigid plate 13 is a glass plate in this embodiment. Alternately, the flat rigid plate 13 is a heater plate and the flat rigid bench 14 is a glass plate.

Figure 3D:
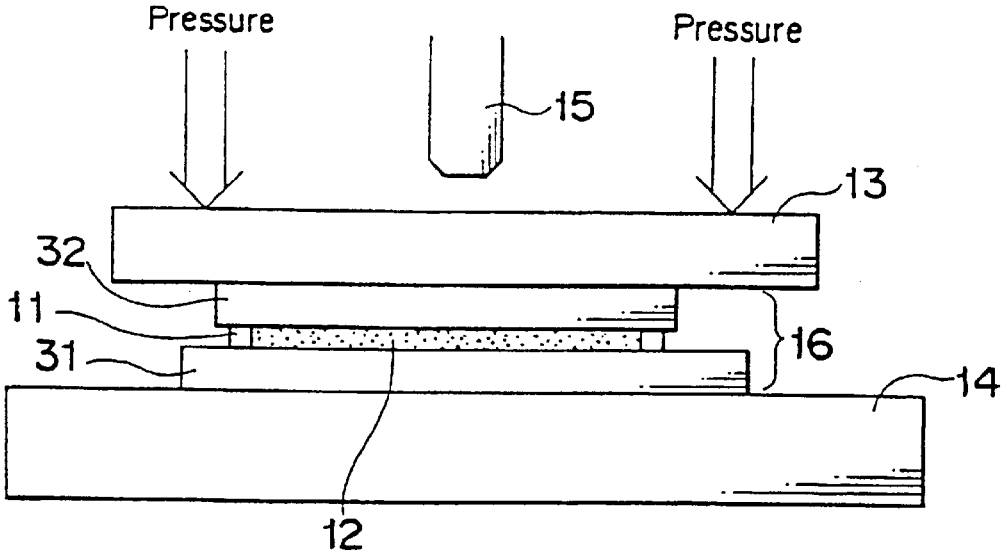

Then, the mixture liquid 12 is heated with the heat generated by the heater plate 14 as illustrated schematically with arrows in FIG. 3(c). The mixture liquid 12 is in a white opaque state at room temperature. If the mixture liquid 12 becomes transparent, the thickness of the mixture liquid can be measured optically with a measuring equipment. The transition temperature to the isotropic or transparent state depends on the species of the polymers and liquid crystal materials, and the mixture liquid 12 is heated to become transparent sufficiently. Then, the thickness of the mixture liquid 12 in a display area of the liquid crystal panel 16 is measured with a thickness measuring equipment 15, as shown in FIG. 3(d). Because the mixture liquid 12 is transparent, the thickness can be measured with a precision of 0.1 $\mu$m.

Figure 4:
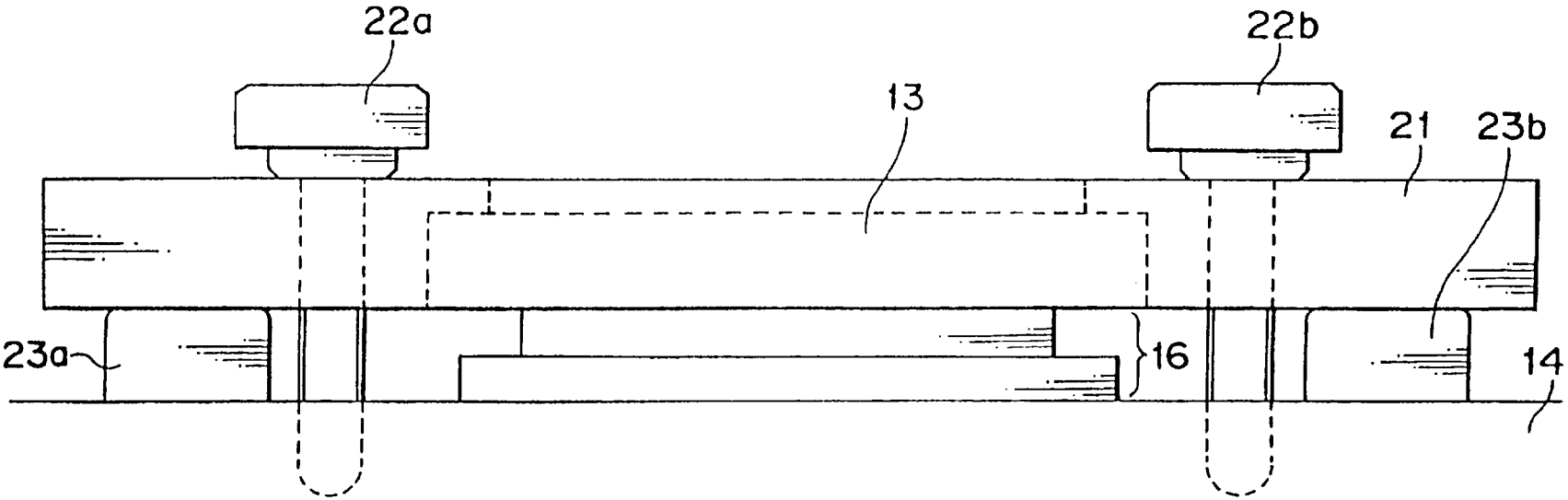
FIG. 4 is a schematic elevational view of a liquid crystal panel under fabrication.

If the measured thickness deviates from a predetermined range, it is necessary to adjust the thickness appropriately. FIG. 4 shows an adjuster for adjusting the thickness of the mixture liquid. Buffer rubbers 23a, 23b are put on the flat rigid bench 14 outside the liquid crystal panel 16. A metal frame 21 is put above the buffer rubbers 23a, 23b, and the flat rigid plate 13 is set at the center of the metal frame 21. The height of the rubbers 23a, 23b is a little lower than the liquid crystal panel 16 so as to provide a small gap between the flat rigid plate 13 and the liquid crystal panel 16. Three screws 22a, 22b and 22c (not shown) are provided at the metal frame 21 so as to press the liquid crystal panel 16 through the flat rigid plate 13. It is preferable that the screws 22a, 22b and 22c have a pitch small enough to control the applied pressure finely. A pressure controller other than screws, such as a hydraulic cylinder may also be used. The mixture liquid 12 is pressed by applying a pressure above the flat rigid plate 13. The thickness of the mixture liquid 12 is restricted to about the height of the sealant resin 11 by the existence of the sealant resin 11 at the periphery. Further, by pressing the flat rigid plate 13 as mentioned above, the thickness of the mixture liquid 12 becomes the same as the height of the sealant resin 11 at the center of the display area.

Usually, the counterelectrode substrate 32 uses a glass substrate of about 1 mm of thickness. Because such a glass plate bends by a small applied pressure, the thickness of the mixture liquid 12 can be controlled by the applied pressure. The thickness can be controlled under monitor with the thickness measuring equipment 15 or the like. The thickness measuring equipment 15 is for example an interferometer used usually for measuring the thickness of liquid crystal layer. It is preferable that the thickness is measured at several positions in the display area simultaneously. If the diagonal length of the liquid crystal panel 16 is about four inches, the thickness can be made uniform even up to the center in the display area by controlling the pressure at the three positions of the metal frame 21. However, if the diagonal length increases to about ten inches, the thickness at the center tends to become larger. In this case, it is needed to add a mechanism to apply a pressure at the central area. For example, a control screw is provided at the central area. When the thickness at the center of the display area becomes the predetermined value, the state under pressure is fixed.

If the thickness of the mixture liquid 12 at the center becomes smaller than the predetermined value, it is needed to increase the thickness at the center by pulling the flat rigid plate 13. For example, a sucker is set at the central area of the flat rigid plate 13 and it is pulled for increasing the thickness up to the predetermined value.

Figure 3E:
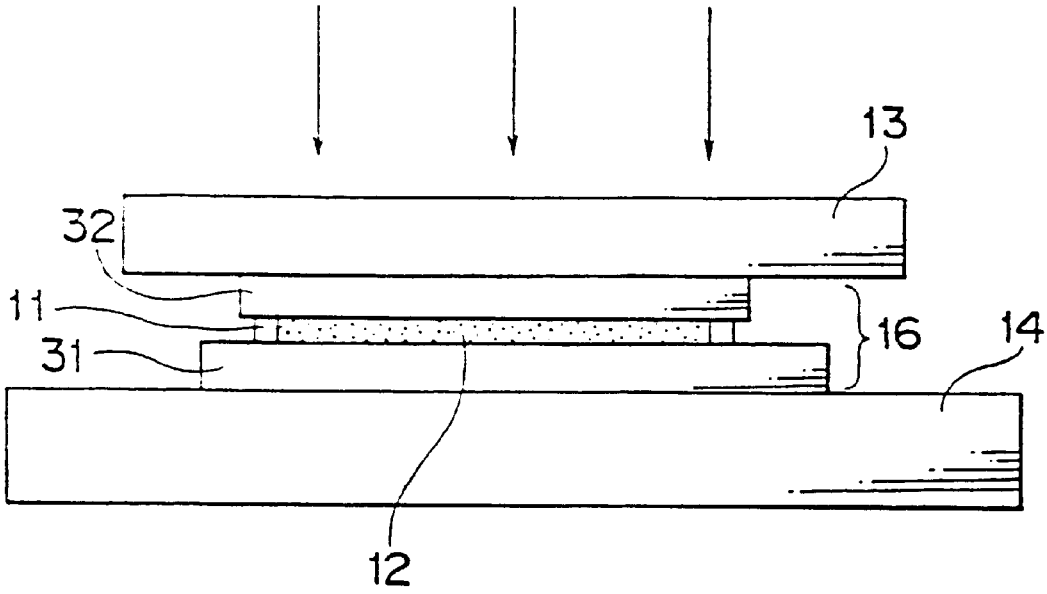

Next, ultraviolet rays radiate the mixture liquid 12 from above the liquid crystal panel 16, as shown in FIG. 3(e), to polymerize the monomers in the mixture liquid 12. Thus, the liquid crystal phase is isolated from the resin component. The temperature control on polymerization is important. The temperature is increased above the nematic to isotropic phase transition temperature which is usually about 40° C. or higher. The ultraviolet rays are irradiated at an intensity of 20–30 mW/cm$^2$ for two to eight minutes. The conditions on the temperature and the intensity are determined with experiments by determining the phase diagram on the liquid crystal weight ratio and the temperature. If the conditions are not appropriate, the grain sizes of liquid crystal droplets and the like change with time, and the scattering properties are deteriorated. The applied pressure is removed after the irradiation for polymerization. It is to be noted that because the resin component in the mixture liquid becomes solid, the thickness of the obtained liquid crystal layer 12 does not change further. This is a characteristic of liquid crystal/resin composite. On the contrary, if a TN liquid crystal is used, the thickness changes back to the original state after the applied pressure for realizing the predetermined thickness is removed.

The flat rigid plate 13 may be an opaque plate. In this case, the flat rigid bench 14 is made of a transparent material and the ultraviolet rays are irradiated from the side of the bench 14. Thus, the present invention is not limited on the direction of radiation or on the irradiation technique.

The mixture liquid 12 may also be isolated into the solid and liquid phases by heating. In this case, the resin component comprises a thermosetting resin.

In the above-mentioned fabrication method, the mixture liquid 12 is injected between the counterelectrode substrate 32 and the array substrate 31, and the thickness of the mixture liquid layer 12 is smoothed to be flat, and then the mixture liquid is polymerized to form a liquid crystal layer of uniform thickness. Therefore, it is easy to control the thickness of the liquid crystal layer. Further, a step for scattering beads or the like is not needed in the fabrication method, and the steps in the fabrication method can be simplified, and the beads are not distributed in the display area of the liquid crystal panel. The thickness of about 15 $\mu$m of a liquid crystal panel including a liquid crystal/resin composite is three times larger than that of a TN liquid crystal panel. Therefore, if beads exist in the display area, the display quality is deteriorated largely. In this embodiment, this problem is solved. The abovementioned embodiment is explained further with reference to examples.

EXAMPLE 1

Pixel electrodes made of transparent indium tin oxide (ITO) and thin film transistors and the like are formed on an array substrate 31, while a counterelectrode made of transparent ITO is formed on a counterelectrode substrate 32. The two substrates 31 and 32 are fixed so as to oppose the electrodes each other. A spacer 11 is made of a sealant resin of ultraviolet-rays-setting resin with dispersed glass fibers of 13 $\mu$m of diameter. Next, ultraviolet rays irradiate the spacer 11 to produce an empty cell.

Next, a mixture liquid 12 having materials of the weight ratio shown in Table 1 is prepared as a material for forming a liquid crystal/resin composite. The nematic-isotropic phase transition temperature shown in Table 1 of the mixture liquid 12 is found to be 30.5° C. from the data measured with a Mettler FP 900 thermoanalysis system.

TABLE 1

Components of mixture liquid

| Matrial | Weight (g) |
|---|---|
| Liquid crystal: BL002 (Merck Japan Co.) | 8.200 |
| monomer: 2-ethylhexyl acrylate (Nakarai Co.) | 0.600 |
| 2-hydroxyethyl acrylate (Nakarai Co.) | 0.600 |
| oligomer: Biscoat 823 (Toagosei Chemical Industry Co.) | 0.600 |
| polymerization initiator: benzyldimethyl ketal (Nippon Kayaku Co.) | 0.060 |

Next, the mixture liquid 12 is injected with the pressure injection technique into the empty cell. The cell with the mixture liquid is called as liquid crystal panel below. The, the liquid crystal panel is put on the device illustrated in FIG. 4, and the thickness of the mixture liquid is measured with a thickness measuring equipment TFM-121AFT model of Orc Co. for measuring the thickness of mixture liquid 12 while a pressure is applied on the glass substrate 32 to the liquid crystal panel at 40° C. in the isotropic state. This temperature is not so high to cause a difference of the measured thickness from the thickness after the phase separation into the liquid crystal and the resin. The measurement is performed at four points in the display area of the liquid crystal panel while the pressure is increased gradually. The pressure is fixed when the measured thickness at the four points become substantially the same as the thickness of the sealant resin 11 of 13 $\mu$m. Then, ultraviolet rays irradiate the mixture liquid 12 at an intensity of 30 mW/cm$^2$ at the substrate surface for six seconds at a temperature of 50° C. Thus, a liquid crystal panel including a liquid crystal/resin composite is completed. The liquid crystal panel is white uniformly in the whole display area under no applied electric field, and a uniform transparent state is realized by applying an electric field.

EXAMPLE 2

A mixture liquid 12 having materials of the weight ratio shown in Table 2 is prepared as a material for forming a liquid crystal/resin composite, and a liquid crystal panel is completed by using the above-mentioned steps explained in Example 1. The nematic-isotropic phase transition temperature shown in Table 2 of the mixture liquid 12 is found to be 27.1° C. from the data measured with the Mettle FP 900 thermoanalysis system. The thickness is measured at 40° C. The completed liquid crystal panel is white uniformly in the whole display area under no applied electric field, and a uniform transparent state is realized by applying an electric field.

TABLE 2

| Components of mixture liquid | |
|---|---|
| Material | Weight (g) |
| liquid crystal: BL002 (Merck Japan Co.) | 8.200 |
| monomer: 2-ethylhexyl acrylate (Nakarai Co.) | 1.200 |
| oligomer: Biscoat 823 (Toagosei Chemical Industry Co.) | 0.600 |
| polymerization initiator: Darocure 1173 (Ciba-Geigy Ltd.) | 0.060 |

EXAMPLE 3

A mixture liquid 12 having materials of the weight ratio shown in Table 3 is prepared as a material for forming a liquid crystal/resin composite, and a liquid crystal panel is completed by using the above-mentioned steps explained in Example 1. The nematic-isotropic phase transition temperature shown in Table 1 of the mixture liquid 12 is found to be 45.5° C. from the data measured with the Mettle FP 900 thermoanalysis system. The thickness is measured at 50° C. The completed liquid crystal panel is white uniformly in the whole display area under no applied electric field, and a uniform transparent state is realized by applying an electric field.

TABLE 3

| Components of mixture liquid | |
|---|---|
| Material | Weight (g) |
| liquid crystal: BL002 (Merck Japan Co.) | 6.200 |
| monomer: 2-hydroxyethyl acrylate (Nakarai Co.) | 2.400 |
| oligomer: MT-1200 (Toagosei Chemical Industry Co.) | 1.400 |
| polymerization initiator: benzyldimethyl ketal (Nippon Kayaku Co.) | 0.060 |

Although the present invention has been fully described in connected with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for manufacturing a liquid crystal panel, which method comprising the steps of:

providing a first electrode substrate and a second electrode substrate;

adhering the first and second electrode substrate via a support member of a predetermined height provided at the periphery of first and second electrode substrates;

providing a mixture liquid comprising a liquid crystal and polymerizable a resin;

filling the mixture liquid in a space inside the support member between the first and second electrode substrates;

measuring the thickness of the mixture liquid interposed between the first and second electrode substrates;

changing the thickness of the mixture liquid within a predetermined range if the measured thickness is outside the predetermined range; and hardening the mixture liquid to separate the mixture liquid into a liquid crystal portion and a resin portion while keeping the thickness within the predetermined range.

2. The method according to claim 1, wherein said support member comprises a sealant resin.

3. The method according to claim 1, wherein in said step of measuring the thickness, said mixture liquid is changed into a transparent state and the thickness is measured in the transparent state.

4. The method according to claim 3, wherein said mixture liquid is changed into a transparent state by heating the mixture liquid to become an isotropic state.

5. The method according to claim 3, wherein in said step of measuring the thickness of said mixture liquid, the thickness is measured at a plurality of positions in a display area of said liquid crystal panel.

6. The method according to claim 3, wherein in said step of changing the thickness of the mixture liquid, a pressure is applied between said first and second electrode substrates.

7. The method according to claim 1, wherein said resin is a photosetting resin and said mixture liquid is hardened by light radiations.

8. The method according to claim 1, wherein said liquid crystal comprises a nematic liquid crystal, said resin is a photo-setting resin, and the normal refractive index of said liquid crystal is substantially equal to that of said photosetting resin.

9. The method according to claim 1, wherein said support member has a height substantially equal to the thickness of said mixture liquid and said support member is located outside a display area of said liquid crystal between said first and second electrode substrates.

10. The method according to claim 1, wherein a ratio of liquid crystal in said mixture liquid is between 20 and 90 weight percent.

11. The method according to claim 10, wherein a ratio of liquid crystal in said mixture liquid is between 50 and 85 weight percent.

12. The method according to claim 1, wherein the height of said support member is between 5 and 25 $\mu$m.

13. The method according to claim 1, wherein said resin is a thermosetting resin and said mixture liquid is changed into a liquid crystal/resin composite by heating.

14. A method for manufacturing a liquid crystal panel, said method comprising the steps of:

providing a first electrode substrate and a second electrode substrate;

providing a mixture liquid comprising a liquid crystal and a polymerizable resin;

filling the mixture liquid between the first and second electrode substrates;

measuring the thickness of the mixture liquid [in the isotropic state];

changing the thickness to within an allowable range if the measured thickness deviates from the allowable range; and hardening the mixture resin to separate into a liquid crystal portion and a resin portion.

15. The method according to claim 14, further comprising a step of changing the thickness within an allowable range if the thickness measured in the measuring step deviates from the allowable range.

16. A method for manufacturing a liquid crystal panel, said method comprising the steps of:

providing a first electrode substrate and a second electrode substrate;

providing a mixture liquid comprising a liquid crystal and a polymerizable resin;

filling the mixture liquid between the first and second electrode substrates;

heating the mixture liquid to form an isotropic state;

measuring the thickness of the mixture liquid in the isotropic state; and hardening the mixture resin to separate into a liquid crystal portion and a resin portion.

* * * * *